United States Patent Office 3,316,210
Patented Apr. 25, 1967

3,316,210
THERMOSETTING AZIRIDINE RESINS
Greene W. Strother, Jr., Lake Jackson, Tex., assignor to The Dow Chemical Company, Midland, Mich., a corporation of Delaware
No Drawing. Filed Aug. 21, 1963, Ser. No. 303,657
9 Claims. (Cl. 260—47)

This invention relates to a thermosetting resin produced by condensing a diphenol with a poly-functional aziridine compound. More particularly, the invention relates to a resin having a thermoplastic "B" stage which is stable at ambient temperatures for a period of time up to six months or more and may be thermally set by heating to an elevated temperature for a brief interval.

The "B" stage of most thermosetting resins is a thermoplastic state wherein the partially condensed product is a dry, non-tacky solid having a shelf life which varies from a few hours to about six months. These resins can be thermoset by heating them to an elevated temperature and holding them at that temperature for a period of time while the condensed molecules become cross-linked. The "B" stage resins are useful as potting resins and in the preparation of prepregs. A glass cloth or other fabric impregnated with a solution of the resin is dried to remove solvent and produce sheets of prepregs which may be stacked together then heated to an elevated temperature and pressure, e.g., 150° C. at 300 p.s.i. for 30 minutes, to obtain a thermoset laminate. For convenience in using these prepregs it is highly desirable that they have a long shelf life so that stocks of them may be prepared periodically and used as needed over an extended interval of time. Additionally the surface of these prepregs should permit their storage in stacks without danger of adhesion. In the case of the potting materials it is desirable that granular particles of the "B" stage resin do not become consolidated and that they remain free-flowing during storage.

According to my invention, a thermosetting resin having a thermoplastic "B" stage suitable for the foregoing uses may be prepared by reacting a diphenol such as bisphenol A with a polyfunctional aziridine compound such as bis(1-aziridinyl)phosphine oxide. Thermoset resins prepared by reacting a polyhydroxy phenol with a compound containing two or more 1-aziridinyl groups have been described in U.S. 2,912,412, Reeves et al.; however, those resins do not have a "B" stage which is adaptable for the preparation of prepregs. Thus, I have found that resins prepared from diphenolic compounds having the hydroxyl groups on separate rings produce "B" stage resins when their reaction with a polyfunctional aziridine is conducted to the proper extent.

These resins may be prepared by dissolving the diphenol in a solvent then adding the aziridine compound and heating the mixture to the reaction temperature. After holding at that temperature for a period of time to promote reaction between the aziridine and diphenol, the solvent may be removed from the mixture by reducing the pressure on the reactor while maintaining the elevated temperature. When the resin is to be used in the preparation of prepregs, the solvent removal step may be omitted and the resulting solution of thermoplastic resin applied directly to the fibers. Thereafter, the sheets of impregnated fibers may be dried and sent to storage. Laminates may be prepared from these prepreg sheets by placing multiple sheets in a press and heating them to a temperature of approximately 150° C. at about 200–300 p.s.i. for 30–60 minutes. The elevated temperature and pressure produce cross-linking and thermosetting of the resin.

Many diphenols may be used in preparing resins according to this invention. Suitable diphenols include bisphenol A and bisphenol F as well as other bisphenols having the phenolic groups linked by an alkyl group, 4,4'-dihydroxy biphenyl, dihydroxyl diphenyl sulfone, and the thiobisphenols where the phenol groups are joined through one or more sulfur atoms. Additionally, any of these diphenols may contain nuclear substituted halogen atoms, e.g., tetrabromo bisphenol A, to impart flame retardant properties to the resin. Mixtures of these diphenols may be used to produce resins having properties slightly different from those based on a single diphenol compound.

There are a number of compounds which contain two or more aziridinyl groups and are suitable for preparing these resins. These compounds may be defined generally by the following structural formulae:

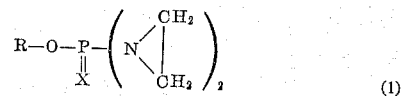

(1)

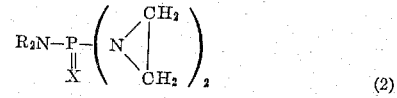

(2)

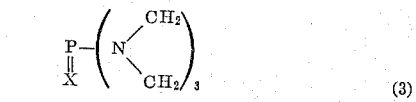

(3)

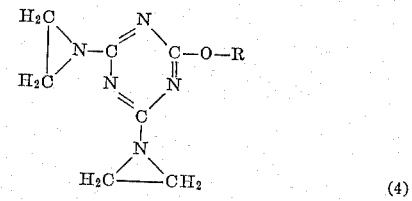

(4)

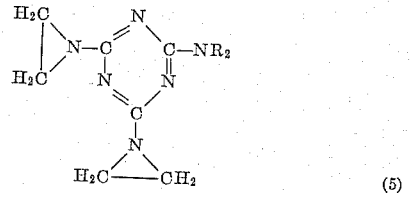

(5)

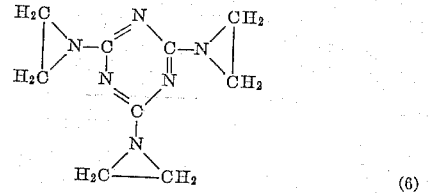

(6)

where X is S or O and R is an aryl or alkyl group containing up to about 8 carbon atoms. Compounds represented by Formula 1 are aryl or alkyl bis(1-aziridinyl)-phosphinates or phosphino thionates. Those of Formula 2 are P,P-bis(1-aziridinyl)-N,N-di aryl or alkyl phosphinic amides or phosphino thioic amides. The compounds according to Formula 3 are tris(1-aziridinyl)-phosphine oxide or sulfide. Those of Formula 4 are 2,4-bis(1-aziridinyl)-6-alkoxy-sym.-triazines and those of Formula 5 are 2,4-bis(1-aziridinyl)-6-di(aryl or alkyl) amino-sym.-triazines. The compound of Formula 6 is tris-2,4,6-(1-aziridinyl) sym.-triazine. The amount of aziridinyl compound which is reacted with the diphenol should provide a reaction mixture containing from 1 to 3 aziridine rings for every 2 hydroxyls in the diphenol. The ratio of 3 aziridine rings for each 2 hydroxyl groups is preferred for the reason that this polymer usually has better stability and versatility than resins produced from reaction mixtures having other ratios.

Any of the known solvents for the diphenols may be used in preparing the reaction mixture except those solvents containing active hydrogen which reacts with the aziridine group. Although a solvent is not essential it is preferred owing to the greater ease in handling the reactants. Also, the melting points of some diphenols are above the decomposition temperature of the aziridine compounds. In those cases a solvent is necessary to provide the proper conditions for reaction. The aziridine compound may be mixed with a quantity of the same or a different solvent. Commercial processes for the preparation of tris(1-aziridinyl)phosphine oxide produce the material in an ethanol solution, therefore it may be desirable to use it in that form. These solutions usually contain about 25 percent alcohol and do not introduce sufficient active hydrogen to produce the undesirable side reactions with the aziridine compound. Condensation of the diphenol and aziridine compound should be carried out at a temperature in the range 60–120° C. and preferably 70–90° C. to avoid thermal decomposition of the aziridine compound. The following examples illustrate the method of preparing these resins and the properties of the thermoset products.

*Example 1*

750 parts by weight of bisphenol A was dissolved in 200 parts by weight of methyl ethyl ketone. 970 parts by weight of an ethanol solution containing 75 percent tris(1-aziridinyl)phosphine oxide was added to the bisphenol A solution. The mixture was heated to 73° C. and maintained at that temperature for 2 hours while the mixture was stirred. The pressure on the reaction chamber was then reduced to vaporize the methyl ethyl ketone and ethanol and remove them from the mixture. The temperature was maintained at 60° C. for an additional 2 hour period. At that time 500 parts of tetrabromobisphenol A dissolved in methyl ethyl ketone was added to the reactor then the solvent removed by vaporization. The temperature was then increased to 80° C. and the reaction continued for about 5 hours at which time approximately 63 percent of the aziridine rings had been reacted. A 1:1 mixture of isopropyl alcohol and tetrahydrofuran was added to the mixture until the viscosity reached about 100 centipoises at room temperature.

Glass cloth was passed through the resin solution then the solvent allowed to evaporate, producing prepreg sheets. Twelve of these sheets were stacked together and placed in a press at 150° C. and 300 p.s.i. for 60 minutes to prepare a 12-ply laminate. The laminate was self-extinguishing according to ASTM Test No. 635 and had the following physical properties:

Flexural strength at 75° F. _____ 102,300 p.s.i.
Izod impact, notched _____ 19.8 ft./lb.
Barcol hardness _____ 85.
Water resistance as percent
  weight gain _____ 0.12% in 7 days.
Acetone resistance as percent
  weight loss _____ 0.003% loss in 7 days.

*Example 2*

A solution containing 150 parts by weight of bisphenol A and 45 parts of methyl ethyl ketone was combined with 159 parts of an ethanol solution containing 76 percent tris(1-aziridinyl)phosphine oxide. The mixture was heated in a reactor at 80° C. for 2 hours with stirring. At that time, the pressure was reduced to volatilize the solvent and remove it from the reactor. The resin was then heated for 5 hours at 92° C. At that time, 63 percent of the aziridine rings had reacted. A quantity of the resin was poured into stick molds and heated to about 150° C. to produce sticks of the thermoset resin. The physical properties of these sticks were as follows:

Izod impact, notched _____ ft./lb__ 0.73
Heat distortion temperature _____ ° F__ 256
Tensile strength _____ p.s.i__ 9920

Another portion of the resin was dissolved in a 1:1 mixture of isopropyl alcohol and tetrahydrofuran and used to produce a glass laminate as in Example 1. The laminate had the following properties:

Flexural strength _____ 92,000 p.s.i.
Izod impact, notched _____ 30.8 ft./lb.
Barcol hardness _____ 81.
Water resistance as percent
  weight gain _____ 0.05% in 7 days.
Acetone resistance as percent
  weight loss _____ 0.01% in 7 days.

This laminate was also self-extinguishing.

In the above examples the thermoplastic "B" stage resin which had been freed of the original solvent was re-dissolved in a 1:1 mixture of isopropanol and tetrahydrofuran to produce a low viscosity solution suitable for preparing prepregs. The concentration of active hydrogen in these solutions is not sufficient to produce undesirable reactions with the residual 30–40 percent aziridine ring in the "B" stage resin.

As indicated in the above examples, the "B" stage is reached after about 5 hours at 75–80° C. The extent of the reaction may be determined qualitatively by withdrawing a small sample of the resin and cooling it to room temperature. The cooled sample will have a dry, non-tacky surface when this stage has been reached. It is desirable to continue the reaction until the aziridine ring content has reached a level in the range from about 30 to about 40 percent and preferably 35–37 percent of that originally present in the reaction mixture. A quantitative measurement can be made by titrating the residual aziridine in a sample of the reaction mixture. An acid solution such as hydrochloric acid may be used to titrate the basic aziridine. Resin solutions containing more than 40 percent aziridine usually have not undergone sufficient condensation to produce the dry, non-tacky "B" stage resin and those containing less than 30 percent generally have become cross-linked and thermoset.

I claim:

1. A thermosettable, thermoplastic resin consisting essentially of the condensation product of a diphenol selected from the group consisting of 4,4'-dihydroxy biphenyl, and biphenyl compounds wherein the phenyl groups are joined by an alkyl, sulfonyl, or thio group, nuclear halogenated compounds of said diphenols, and mixtures thereof, and a polyfunctional aziridine compound wherein a mixture containing about 1 to 3 aziridine rings for every 2 hydroxyl groups in said diphenol is reacted at a temperature of about 60–120° C. until about 60–70 percent of said aziridine rings have reacted.

2. A resin according to claim 1 wherein said polyfunctional aziridine compound is tris(1-aziridinyl)phosphine oxide.

3. A resin according to claim 1 wherein the reaction temperature is from about 70–90° C.

4. A resin according to claim 1 wherein the mixture is further condensed and cross-linked at a temperature near 150° C.

5. A dry, non-tacky prepreg comprising a fibrous material impregnated with a thermosettable thermoplastic resin as set out in claim 1.

6. A thermosettable, thermoplastic resin produced by mixing an ethanol solution containing about 1 to 1.5 equivalents of tris(1-aziridinyl)phosphine oxide with a methyl ethyl ketone solution containing 1 equivalent of bis(4-hydroxyphenyl)dimethylmethane, said ethanol solution containing no more than about 25 weight percent ethanol and said methyl ethyl ketone solution containing about 25 weight percent methyl ethyl ketone, heating said mixture to a temperature of approximately 80° C. and maintaining said temperature for a period of about 2 hours while stirring said mixture, then reducing the pressure on said mixture and removing the vapors of said solvent methyl ethyl ketone and ethanol therefrom until substantially all of said solvent is removed, thereafter heating said resinous mixture of tris(1-aziridinyl)phosphine oxide and bis(4-hydroxyphenyl)dimethylmethane for a period of about 5 hours at a temperature of about 90° C., then cooling said resin to obtain a dry, non-tacky thermoplastic product at room temperature.

7. A resin according to claim 6 wherein said resin is dissolved in a 1:1 mixture of isopropanol and tetrahydrofuran prior to the cooling and solidification of said thermoplastic product.

8. The method of producing a thermosettable thermoplastic resin consisting essentially of reacting a mixture of a polyfunctional aziridine compound and a diphenol selected from the group consisting of 4,4'-dihydroxy biphenyl, and biphenyl compounds wherein the phenyl groups are joined by an alkyl, sulfonyl, or thio group, nuclear halogenated compounds of said diphenols, and mixtures thereof, containing about 1 to 3 aziridine rings for each 2 hydroxyl groups in said diphenol at a temperature of about 70–90° C. until about 60–70 percent of said aziridine groups have reacted, then cooling said thermoplastic product to room temperature.

9. The method according to claim 8 wherein the reaction of said aziridine compound with said diphenol is carried out in the presence of a solvent for said reactants.

References Cited by the Examiner

UNITED STATES PATENTS

| | | | |
|---|---|---|---|
| 2,582,613 | 1/1952 | Wohnsiedler | 260—47 |
| 2,682,521 | 6/1954 | Coover | 260—47 |
| 2,891,915 | 6/1959 | McCormack | 260—47 |
| 2,912,412 | 11/1959 | Reeves | 260—47 |
| 3,169,122 | 2/1965 | Hennes | 260—47 |

SAMUEL H. BLECH, *Primary Examiner.*

WILLIAM H. SHORT, *Examiner.*

M. GOLDSTEIN, J. C. MARTIN, *Assistant Examiners.*